May 21, 1935.  A. S. NEWMAN  2,001,884
FILM BOX OR CHARGER
Filed Sept. 1, 1934
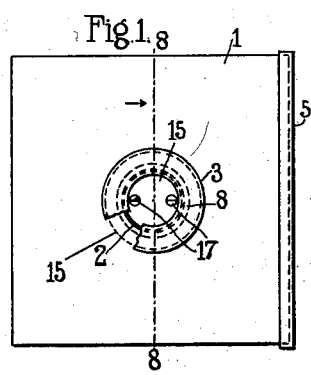
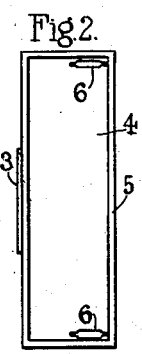
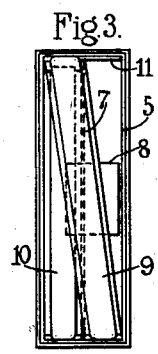
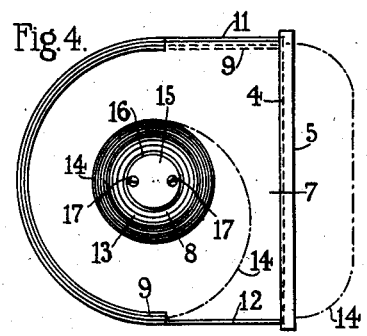
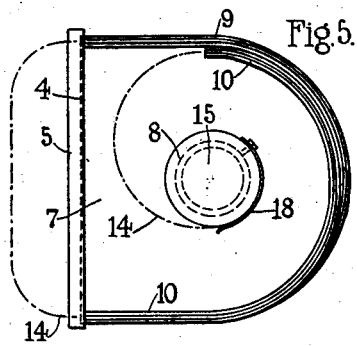
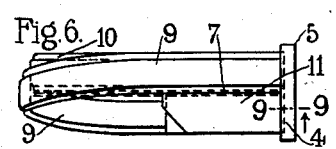
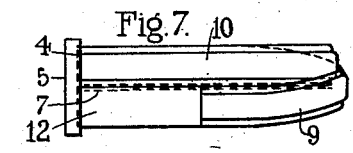
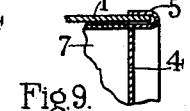
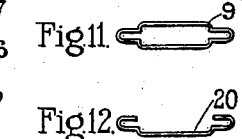
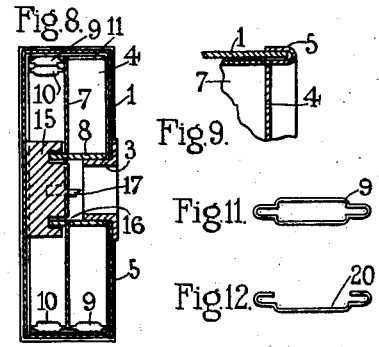

Patented May 21, 1935

2,001,884

UNITED STATES PATENT OFFICE 2,001,884

FILM BOX OR CHARGER

Arthur Samuel Newman, Highgate, London, England, assignor to Pathéscope Limited, London, England Application September 1, 1934, Serial No. 742,384
In Great Britain September 18, 1933

3 Claims. (Cl. 242—71)

The invention relates to that kind of film box, known in the trade as a charger, adapted to contain in one compartment a spool carrying unexposed film which after passing through the camera is led back into another compartment.

The object of the present invention is to provide such a box that is simple to construct, that will accommodate a long length of film in a box of small cubical capacity and which may be closed light-tight without any danger of the box being opened by an unauthorized person.

According to the present invention the film box has an outer casing and an inner part. The inner part has means for carrying a transverse tube adapted to carry at one end a roll of sensitized film and at the other end a take-up centre piece on to which the exposed film is wound. Means are provided for locking the casing to the inner part consisting of a flanged tube, the tubular part passing through an aperture in the outer casing and fitting tightly within the said transverse tube and the flanged part fitting closely against the outer casing. The said centre piece is formed so that it may be driven through the locking device and the transverse tube. Two apertures are formed in the film box, the one to allow the film to pass to the gate and the other to allow the exposed film to return to the centre piece.

According to the preferred construction the said inner part has a front plate in which are formed the two apertures. Said front plate has a trough around its exterior and a carrier at its rear to support two guides for the film, one guide leading the sensitized film from a roll to one of said apertures and the other guide leading the exposed film from the other aperture to the take-up centre piece.

The carrier may be a flat plate and to lighten the box it may be replaced by bars. One guide may be located within two parallel planes and may be on one side of said carrier and the other guide may pass outside or around the first mentioned guide and be inclined so as to pass from one side to the other side of said carrier.

The invention is illustrated in the accompanying drawing in which:

Fig. 1 is a side elevation of the complete film box known as a charger partly broken away.

Fig. 2 is a front elevation of the same.

Fig. 3 is a rear elevation of the inner part of the film box.

Fig. 4 is a side elevation of the inner part seen from the feed side of the same.

Fig. 5 is a side elevation of the inner part seen from the take-up side.

Fig. 6 is a plan of the inner part.

Fig. 7 is a plan of the inner part reversed or turned over as compared with Fig. 6.

Fig. 8 is a section on the line 8—8 of Fig. 1 seen in the direction of the arrow.

Fig. 9 is an enlarged sectional view taken on the line 9—9 of Fig. 6.

Fig. 10 is a side elevation of the inner part corresponding to Fig. 5, except that the take-up centre piece has been omitted, showing a modification.

Fig. 11 is an end view of a guide tube for the film, and Fig. 12 is an end view of a guide trough, both shown to an enlarged scale.

The box body 1 has an aperture 2 in one side thereof adapted to receive a locking piece 3 in the form of a tube having a flat flange.

The inner part has a front plate 4 surrounded by a trough 5 to receive the edges of the open end of the box body 1 and make a light-tight joint as shown clearly in Fig. 9. The front plate 4 has an aperture 6 at its upper part for the exit of the sensitized film, and another aperture 6 at its lower part through which the film enters the film box after exposure. To the rear of the front plate 4 is fixed a carrier in the form of a flat plate 7. An aperture is made in the plate 7 to receive a carrier tube 8. The plate 7 also carries two curved guides in the form of tubes 9 and 10.

The guide tube 10 as seen in Figs. 6 and 7 is bounded by two parallel planes and is entirely on one side of the carrier plate 7, one end opening at the lower aperture 6 and the other end opening within the film box. The guide tube 9 leads by one of its ends from the upper aperture 6, and passes in an incline outside the other tube 10. The tube 9 starts from the upper aperture 6 on one side of the carrier plate 7 and finishes on the other side of said plate as seen in Figs. 3, 6 and 7. The carrier plate 7 has fixed thereto two plates 11 and 12 to make an accurate fit within the inner part of the box body 1.

On one end of the tube 8 is mounted a cardboard tube 13 upon which is wound sensitive film 14. On the other end of the tube 8 is mounted a take-up centre piece 15 having a groove 16 fitting over the end of the tube 8. The centre piece 15 is provided with two half pins 17 enabling the centre piece 15 to be driven from the exterior through the centre of the locking piece 3. The centre piece 15 has a spring 18 under which the end of the film 14 is held in known manner.

The tubular portion of the locking piece 3 accurately fits the inner part of the tube 8, thus locking the inner and outer parts together, and the flat flange of the locking piece 3 fits accurately against one of the sides of the box body 1, thus making a light-tight joint.

In the modification shown in Fig. 10 the carrier tube 8 and the guide tubes 9 and 10 are supported by bars 19. The ends of the tubes 9 and 10 are fixed to the front plate 4, and the inner ends of the guide tubes 9 and 10 are connected by the side plates 11 and 12 to the plate 4 in a similar manner to that shown in Fig. 4. These plates 11 and 12 do not show in Fig. 10 as they are located behind the said guide tubes.

The locking piece 3 is a tight fit within the tube 8, and its flange fits tightly against the outer face of the box body 1. The locking piece 3 is therefore not likely to be displaced in transit, and owing to the close fit between the flange of the locking piece and the outer face of the box body it is difficult to remove the locking piece unless a suitable tool, forming no part of the present invention, be employed.

The guides 9 and 10 for the film shown in Fig. 8 are tubular as shown more clearly in Fig. 11. Instead of using tubular guides, troughs 20 of known form, such as shown in Fig. 12, may be employed for guiding the film.

What I claim as my invention is:—

1. A film box or charger having an outer casing and an inner part, the inner part having means for carrying a transverse tube adapted to carry at one end a roll of sensitized film and at the other end a take-up centre piece on to which the exposed film is wound, means for locking the casing to the inner part consisting of a flanged tube, the tubular part passing through an aperture in the outer casing and fitting tightly within the said transverse tube and the flanged part fitting closely against the outer casing, the said centre piece being provided with means so that it may be driven through the locking device and the transverse tube, and two apertures, the one to allow the film to pass out of the box and the other to allow the exposed film to return to the take-up centre piece.

2. A film box or charger having an outer casing and an inner part, the inner part having a front plate in which are formed two apertures, said front plate having a trough around its exterior and a carrier at its rear, two guides for the film and a transverse tube supported by said carrier, one guide leading the sensitized film from a roll mounted on one end of the transverse tube to one of said apertures, and the other guide leading the exposed film from the other aperture to a take-up centre piece mounted on the other end of the transverse tube, means for locking the casing to the inner part consisting of a flanged tube, the tubular part passing through an aperture in the outer casing and fitting tightly within the said transverse tube and the flanged part fitting closely against the outer casing, the said centre piece being provided with means so that it may be driven through the locking device and the transverse tube.

3. A film box or charger having an outer casing and an inner part, the inner part having a front plate in which are formed two apertures, said front plate having a trough around its exterior and a carrier at its rear, two guides for the film and a transverse tube supported by said carrier, one guide leading the sensitized film from a roll mounted on one end of the transverse tube to one of said apertures and the other guide leading the exposed film from the other aperture to a take-up centre piece mounted on the other end of the transverse tube, one guide being located within two parallel planes and on one side of said carrier, and the other guide passing around the outside of the first mentioned guide and being inclined so as to pass from one side to the other side of said carrier, and means for locking the casing to the inner part consisting of a flanged tube, the tubular part passing through an aperture in the outer casing and fitting tightly within the said transverse tube and the flanged part fitting closely against the outer casing, the said centre piece being provided with means so that it may be driven through the locking device and the transverse tube.

ARTHUR SAMUEL NEWMAN.